Aug. 26, 1924.
E. BASSO
DRAW FRAME
Filed Oct. 21, 1921
1,506,554
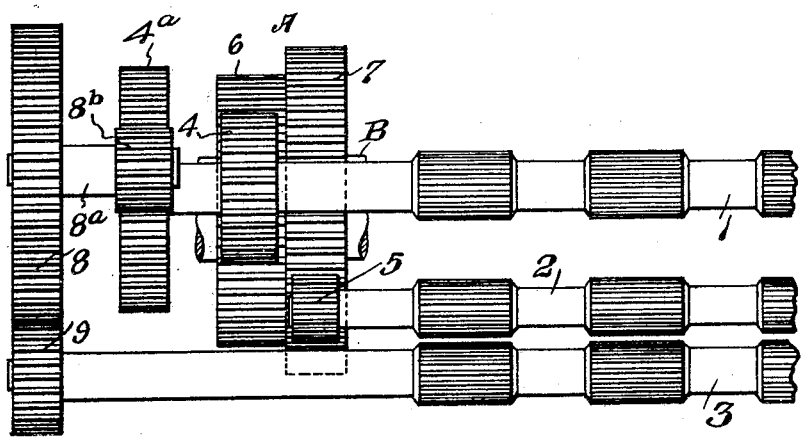
Inventor:
Ernesto Basso
By  Munn & Co.
Attorneys Patented Aug. 26, 1924.

1,506,554

UNITED STATES PATENT OFFICE.

ERNESTO BASSO, OF VIGEVANO, ITALY, ASSIGNOR TO THE SOCIETÀ ITALIANA BREVETTI PER FILATURA, BERTULETTI & C., OF MILAN, ITALY, A COMPANY OF ITALY.

DRAW FRAME.

Application filed October 21, 1921. Serial No. 509,412.

*To all whom it may concern:*

Be it known that I, ERNESTO BASSO, subject of the King of Italy, residing at Vigevano, in the Kingdom of Italy, have invented certain new and useful Improvements in Draw Frames, of which the following is a specification.

As is well known, in the drawing frames at present in use the trouble is frequently experienced that the fibres break and as a consequence the yarn turned out is uneven and defective in strength. This is due to the fact that the drawing of the sliver mainly occurs on the passage from the second to the third rollers, owing to the rate of speed at which the said rollers revolve with respect to one another.

The object of the invention is to overcome this objection and to this end I distribute the drawing of the fibres between the several rollers, so that they will not be subjected to excessive strain.

In the accompanying drawing forming a part of this specification, a plan view of a portion of a drawing frame having the improvement applied, is shown.

Referring to the drawing 1, 2 and 3 represent the roller-carrying shafts, upon each of which is a plurality of rollers as usual. It is to be understood that shafts with rollers are arranged below the shafts 1, 2 and 3.

On the shaft 3 is a pinion 9 with which meshes the gear wheel 8 driven by any suitable means. The shaft $8^a$ of the gear wheel 8 carries the pinion $8^b$, which meshes with the gear wheel $4^a$ on the shaft 1. On the shaft 1 is another gear wheel 4, which is smaller than the gear wheel $4^a$ and which meshes with the gear wheel 6 of a multiplying gear A on the counter shaft B. The multiplying gear A consists of two gears 6 and 7 of unequal size, and the larger gear wheel 7 meshes with the pinion 5 on the shaft 2.

By thus gearing the shafts together the shaft 3 will have the greatest speed, and the shaft 2 will have a speed intermediate of that of the shafts 1 and 3. In other words, such a velocity will be imparted to the shaft 2 as to obtain a first stretching of the fibres in the ratio of 1:8, for instance, on the passage from the rollers on shaft 1 to the rollers on shaft 2, whilst owing to the maximum speed imparted to the shaft 3 by the gear pair 8, 9 the stretching on the passage from the rollers on shaft 2 to the rollers on shaft 3 is proportionately reduced from 20 to 8.

In this way the stretching of the sliver is performed in two successive stages and the fibres are no longer subjected to excessive strain.

The novel arrangement can be fitted to existing drawing frames without need of replacing the rollers or shifting the shafts nearer to one another; the alteration of existing plants can therefore be carried out at a minimum cost.

Having now particularly described and ascertained the nature of my said invention, and in what manner the same is to be performed, I declare that what I claim is:

In a drawing frame, the combination with the roller-carrying shafts, of a pinion on the third shaft, a driven gear wheel meshing with the pinion, a pinion carried by the gear wheel, two gears of unequal size on the first shaft and with the larger one of which the pinion carried by the driven gear wheel meshes, a counter shaft, two gears of unequal size on the counter shaft and with the smaller one of which the smaller gear wheel of the first shaft meshes, and a pinion on the second shaft and with which the larger gear wheel of the counter shaft meshes.

Signed at Milan (Italy), this 4th day of October 1921.

ERNESTO BASSO.